J. BINDON.
ANTISLIPPING DEVICE FOR HORSESHOES.
APPLICATION FILED FEB. 21, 1911.

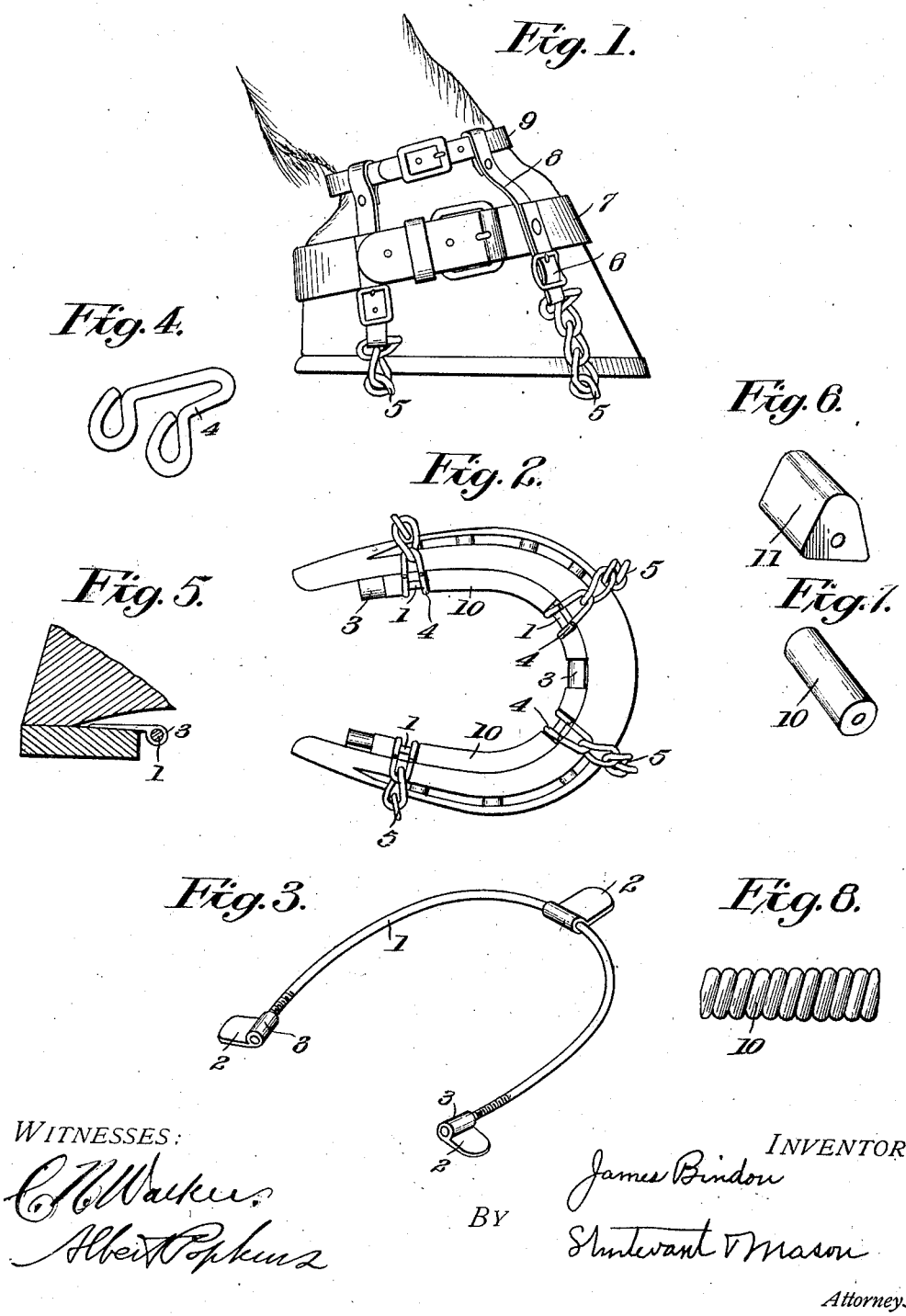

1,003,324.

Patented Sept. 12, 1911.

2 SHEETS—SHEET 2.

WITNESSES:

INVENTOR
James Bindon
BY
Sturtevant & Mason
Attorneys

UNITED STATES PATENT OFFICE.

JAMES BINDON, OF NEWPORT, RHODE ISLAND.

ANTISLIPPING DEVICE FOR HORSESHOES.

1,003,324.  Specification of Letters Patent.  Patented Sept. 12, 1911.

Application filed February 21, 1911. Serial No. 610,000.

*To all whom it may concern:*

Be it known that I, JAMES BINDON, a citizen of the United States, residing at Newport, in the county of Newport, State of Rhode Island, have invented certain new and useful Improvements in Antislipping Devices for Horseshoes, of which the following is a description, reference being had to the accompanying drawing and to the letters and figures of reference marked thereon.

My invention relates to improvements in overshoes for horses, the object being to provide a device of this character which may be readily applied to the horse's hoof, and which will prevent slipping upon pavements which may be slippery from ice or other causes.

I am aware that it has been heretofore proposed to provide detachable calks for horseshoes, and also to provide an overshoe composed of a plurality of movably connected links forming chains which intervene between the hoof and the ground. Such chain structure usually consists of a series of short chains converging toward the center of the hoof, and united to a central chain surrounding the frog, or to a central split ring, the chains underlying the ordinary shoe on the hoof, and being secured at their upper ends to a band or strap surrounding the hoof.

The present invention consists in various details of construction and arrangement, whereby the anti-slipping devices may be held more securely in place, and yet are more readily and easily detached when such becomes necessary; and whereby the noise of the clanking of the chains is dispensed with; the weight of the overshoe reduced to a minimum; and danger of injury to the frog of the hoof done away with.

Figure 9:
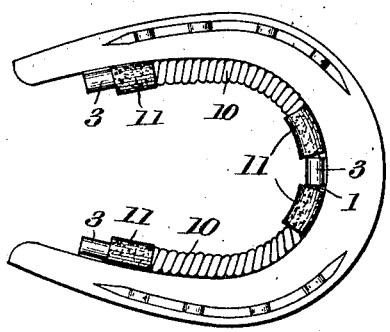
Figure 10:
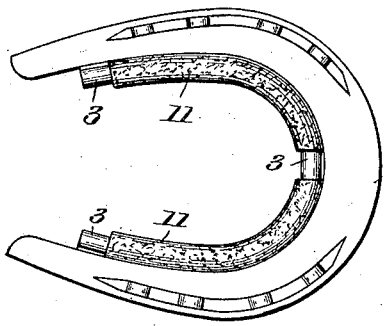

The invention is illustrated in the accompanying drawings, in which,—Figure 1 is a side view, showing a hoof provided with an ordinary horseshoe, and having my improved chain tread and securing means in place; Fig. 2 is a bottom view of the same; Fig. 3 is a detached view of the spring plate or bar, to which the chains or calks are attached; Fig. 4 is a detail view of the clamp, by which the chain is attached to the spring plate or bar; Fig. 5 is a detail sectional view; Fig. 6 is a detail view of one of the calks which may be used instead of the chains; Figs. 7 and 8 are detail views of devices I may use for keeping the chains properly spaced; Fig. 9 is a bottom view showing the use of calks with spacing members on the spring bar, without the use of the chains; Fig. 10 is a similar view, showing the use of two calks only, which are of length sufficient to enable the spacing members to be dispensed with; and Fig. 11 is a similar view showing calks interposed between the sides of the clip or bar 4.

The main feature of my invention consists of the curved plate or bar 1 of spring metal, having the removable plates 2, the shanks of which are screwed or otherwise removably secured to the plate or bar 1. The flat or beveled parts of the plates are offset from the shanks 3 and the bar or plate is inserted in place in the following manner: The plate 2 at the toe is put into place between the hoof and the shoe and then the plate or bar 1 is bent to spring the two other plates 2 into position. This bar or plate 1 is set off from the inside of the shoe, as shown in Fig. 2, and at intervals around the bar 1 clamps 4, shown in Figs. 2, 4 and 11, are secured to it, and the chains 5 are attached to said clamps and extend under the tread of the shoe, and at the upper ends are attached to the straps 6 depending from the hoof or base band 7, and connecting straps 8 extend to the top band 9, which passes through loops in said straps 8. The chains are attached to the straps 6 by buckles or snap-hooks, or in any suitable way, and said straps may be covered with copper, or otherwise strengthened where they are attached to the hoof band. The chains may be secured directly to the bar 1, instead of to the clamps 4, but the latter alternative is preferable. The clamps 4, or the chains themselves, are spaced apart by the spacing blocks 10, which may be of rubber, rope, or any suitable material.

As shown in Fig. 9, instead of the chains being used, a series of calks 11 separated by spacing members 10 is used. In Fig. 10 spacing members are dispensed with entirely, and two calks 11 are used to take up substantially the whole space along each side of the horseshoe.

Figure 11:
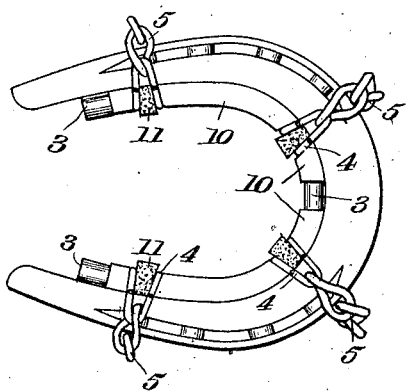

In Fig. 11, the clamps 4, chains 5 and spacing members 10 are used, but in addition thereto calks 11 are strung upon the spring bar or plate 1, located in between the arms of the clip or clamp 4. It will be seen that in the use of the clip or clamp 4, the shank or end of the same to which the chain is attached, underlies the horseshoe and forms a part of the anti-slipping device.

Various minor modifications and changes may be made in the construction and arrangement of the parts, without departing from the spirit of my invention.

Having thus described my invention, what I claim as new and desire to secure by Letters Patent, is:—

1. An attachment for horseshoes including a bar supported by projections extending between the hoof and the shoe, non-slipping devices attached thereto, said non-slipping devices comprising chains attached at one end to the bar, and means for the attachment of the other ends of said chains to the hoof.

2. An attachment for horseshoes including a bar supported by projections extending between the hoof and the shoe, non-slipping devices attached thereto, said non-slipping devices comprising chains attached at one end to clamps on the bar, and means for the attachment of the other ends of said chains to the hoof.

3. An attachment for horseshoes comprising a base band having a connecting device, a top band having a connecting device, intermediate connections between the top band and the base band, fastening devices carried by the base band, and chains connected at one end with said fastening devices and underlying the horseshoe, and a bar offset from the horseshoe but secured between the shoe and the hoof, to which the opposite ends of the chains are attached.

4. In combination the spring bar having plates sprung into position between the hoof and the shoe, removable clips or clamps spaced on said bar, chains attached at one end to the clips and underlying the shoe, and strap devices surrounding the hoof and having means for the attachment of the other ends of the chains.

5. An attachment for horseshoes, comprising a bar or plate offset from the inside of the horseshoe, but adapted for attachment between the shoe and the hoof, clamps or clips arranged thereon at intervals and having their shanks underlying the horseshoe, and chains attached to said shanks, with means for securing said chains to the hoof.

In testimony whereof I affix my signature, in presence of two witnesses.

JAMES BINDON.

Witnesses:
A. M. PARKINS,
C. L. STURTEVANT.